W. H. MAIN.
Rotary Harrow.
No. 22,026.
Patented Nov. 9. 1858
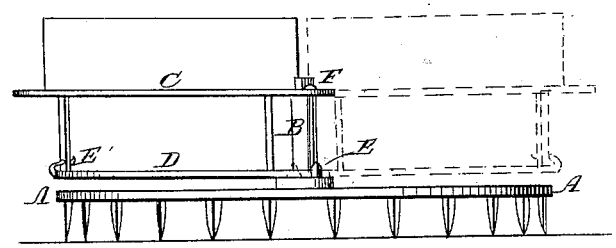
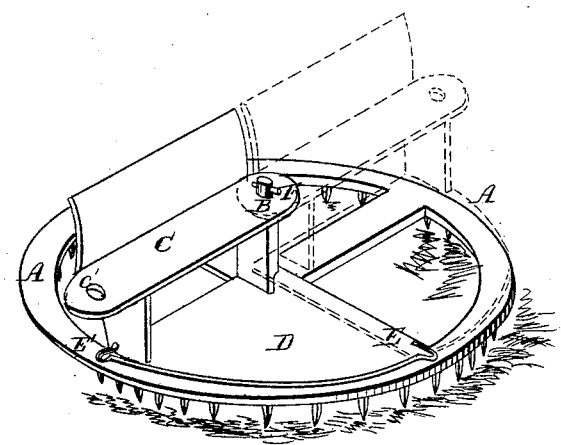

UNITED STATES PATENT OFFICE.

WILLIAM H. MAIN, OF LIVERPOOL, OHIO.

IMPROVEMENT IN ROTARY HARROWS.

Specification forming part of Letters Patent No. 22,026, dated November 9, 1858.

*To all whom it may concern:*

Be it known that I, W. H. MAIN, of Liverpool, in the county of Medina and State of Ohio, have invented certain new and useful Improvements in Rotary Harrows; and I do hereby declare the following to be a full and complete description thereof, reference being had to the accompanying drawings, in which—

Figure 1 is a perspective view of my improved harrow, and Fig. 2 a front elevation.

Like letters refer to like parts in the different views.

The nature of my improvement consists in so arranging the driver's seat with respect to the harrow and to the point of draft that the weight of the driver thereon shall rotate the harrow, and so that by a change in the position of the driver on the seat the teeth of the harrow will be caused to press deeper into the ground or will press lighter, so as to break up the ground more or less, as circumstances may require; also, so that by a change in the position of the seat the harrow shall rotate either toward the right or left.

A represents the harrow, which is circular; B, an arm or center pin, which extends upward from the center of the harrow and at right angles to the plane of its upper surface; C, the driver's seat; D, a platform upon which the driver may place his feet to give him greater ease and stability in his seat, and to preserve his feet from injury. The arm B passes through a hole or socket in the platform D, so that the platform revolves upon the arm. The arm also passes loosely through a hole, c, in the driver's seat, C, and the seat being placed upon the platform, both seat and platform revolve together round the arm B.

E E' are hooks at each of the two front ends of the platform, and to which the whiffletrees are to be attached; F, a pin inserted in the arm B above the driver's seat to keep the seat and platform in place upon the arm. The draft being attached to the hook E and the driver having taken his place upon the seat, his weight will press down the teeth of that side of the harrow upon which he is placed, and when the harrow moves forward it will rotate in the direction opposite that in which the seat is placed—that is, if the seat be upon the right of the arm or center pin, as shown in Figs. 1 and 2, the harrow will rotate toward the left, the seat C acting as a lever, the fulcrum of which is the arm B. The farther the driver is seated from the center pin the deeper will the harrow be pressed into the ground. If he wishes to harrow lightly, he will move nearer the center pin. If the harrow were rotated by a fixed weight over the rim of the harrow, or otherwise, it could not be shifted so as to cause the harrow to press lighter or deeper into the ground with as much ease and facility as the driver can shift his position on the seat. When the seat is placed upon the left of the arm B, as shown by the red lines in Figs. 1 and 2, the harrow will rotate toward the right. Thus the harrow will rotate either toward the right or left, according to the position of the driver's seat. To change the seat the pin F is withdrawn, the seat lifted off, the seat and platform lifting together, and the arm allowed to pass through the hole $c'$ in the other end of the seat. The whiffletrees are then to be attached to the hook E'. The same arrangement is applicable to harrows of different form, such as square or triangular.

What I claim as my invention, and desire to secure by Letters Patent, is—

The combination of the arm or center pin, B, and draft-bar or platform D with the seat C, substantially as arranged, for the purpose of causing the harrow to rotate by the weight of the person on the seat, as set forth.

WM. H. MAIN.

Witnesses:
   A. CARS,
   S. C. PRICHARD.